(12) United States Patent
Höppel et al.

(10) Patent No.: US 11,414,019 B2
(45) Date of Patent: Aug. 16, 2022

(54) STOWAGE COMPARTMENT ASSEMBLY WITH EXTERNAL FORCE-ACTUATED WALL ELEMENT AND PIVOTABLE FLOOR ELEMENT

(71) Applicant: Brose Fahrzeugteile SE & Co. Kommanditgesellschaft, Coburg, Coburg (DE)

(72) Inventors: Michael Höppel, Bad Staffelstein (DE); Fabian Lang, Ergersheim (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 202 days.

(21) Appl. No.: 16/963,696

(22) PCT Filed: Jan. 23, 2019

(86) PCT No.: PCT/EP2019/051563
§ 371 (c)(1),
(2) Date: Dec. 9, 2020

(87) PCT Pub. No.: WO2019/145325
PCT Pub. Date: Aug. 1, 2019

(65) Prior Publication Data
US 2021/0362655 A1    Nov. 25, 2021

(30) Foreign Application Priority Data
Jan. 23, 2018 (DE) ..................... 10 2018 201 004.8

(51) Int. Cl.
*B60R 7/04* (2006.01)
*B60R 7/02* (2006.01)
*B60R 7/06* (2006.01)

(52) U.S. Cl.
CPC ................. *B60R 7/04* (2013.01); *B60R 7/02* (2013.01); *B60R 7/06* (2013.01); *B60R 7/043* (2013.01); *B60R 7/046* (2013.01); *B60Y 2400/30* (2013.01)

(58) Field of Classification Search
CPC .............. B60R 7/02; B60R 7/04; B60R 7/046
(Continued)

(56) References Cited

U.S. PATENT DOCUMENTS

2015/0360616 A1    12/2015    Shami

FOREIGN PATENT DOCUMENTS

| DE | 19908959 A1 | 9/2000 |
|---|---|---|
| DE | 20315236 U1 | 12/2003 |

(Continued)

*Primary Examiner* — Jason S Morrow
(74) *Attorney, Agent, or Firm* — Brooks Kushman, P.C.

(57) ABSTRACT

A stowage compartment assembly for a vehicle comprising support and wall elements arranged on a front side of the support element, the wall element adjusts between a non-use position and a functional position. In the non-use position the wall element extends along a contour of the front side of the support element and in the functional position, projects with at least one section from the front side of the support element and is elastically deformed, to form a stowage compartment; and a drive device for adjustment of the wall element. The stowage compartment assembly includes at least one pivotably mounted floor element adjustable between a storage position and a functional position and, when the wall element is in use, is pivoted from its storage position into its functional position and defines a floor of the stowage compartment.

20 Claims, 12 Drawing Sheets

(58) Field of Classification Search
USPC .............................................. 296/37.8, 37.13
See application file for complete search history.

(56) References Cited

FOREIGN PATENT DOCUMENTS

| | | |
|---|---|---|
| DE | 10321988 A1 | 7/2004 |
| DE | 10341833 A1 | 4/2005 |
| DE | 102005017565 A1 | 12/2006 |
| DE | 102005035273 A1 | 2/2007 |
| DE | 102007014801 A1 | 10/2008 |
| DE | 102008018553 A1 | 10/2009 |
| DE | 102011088377 A1 | 6/2013 |
| DE | 202015101858 U1 | 4/2015 |
| DE | 102015102896 A1 | 9/2015 |
| DE | 102014215178 A1 | 2/2016 |
| DE | 102016102903 A1 | 8/2017 |
| DE | 102017105908 A1 | 10/2017 |
| DE | 102017201626 A1 | 8/2018 |

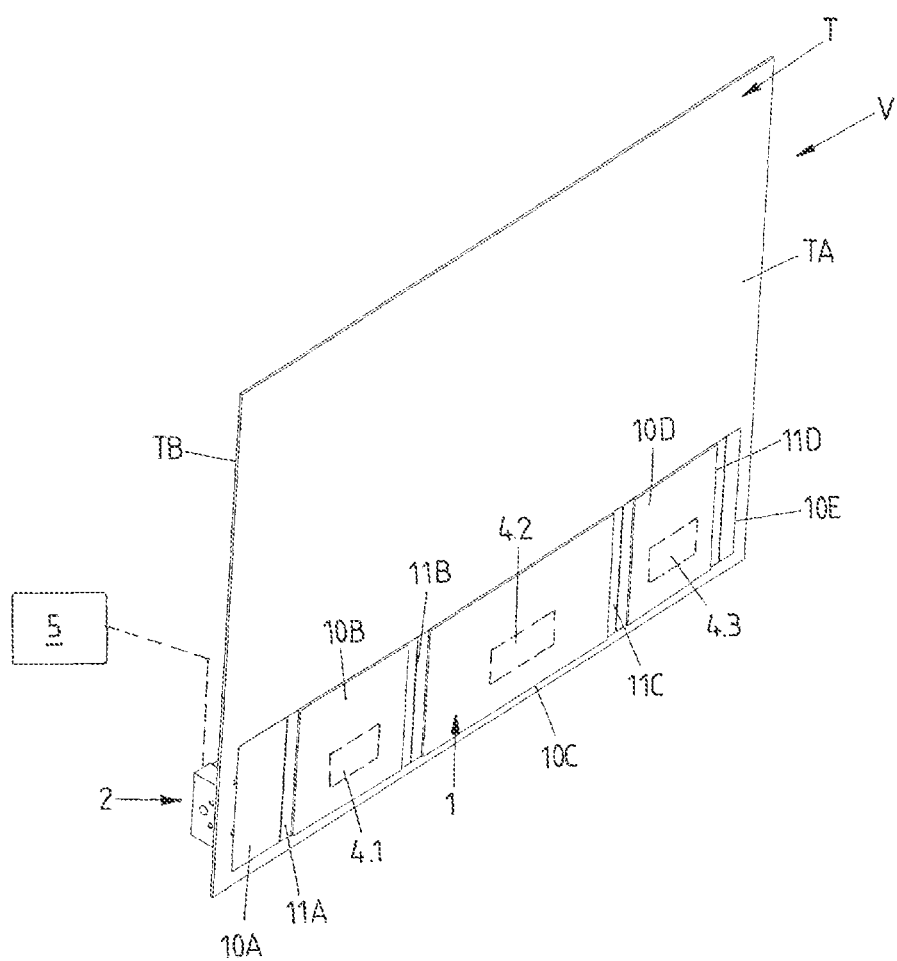

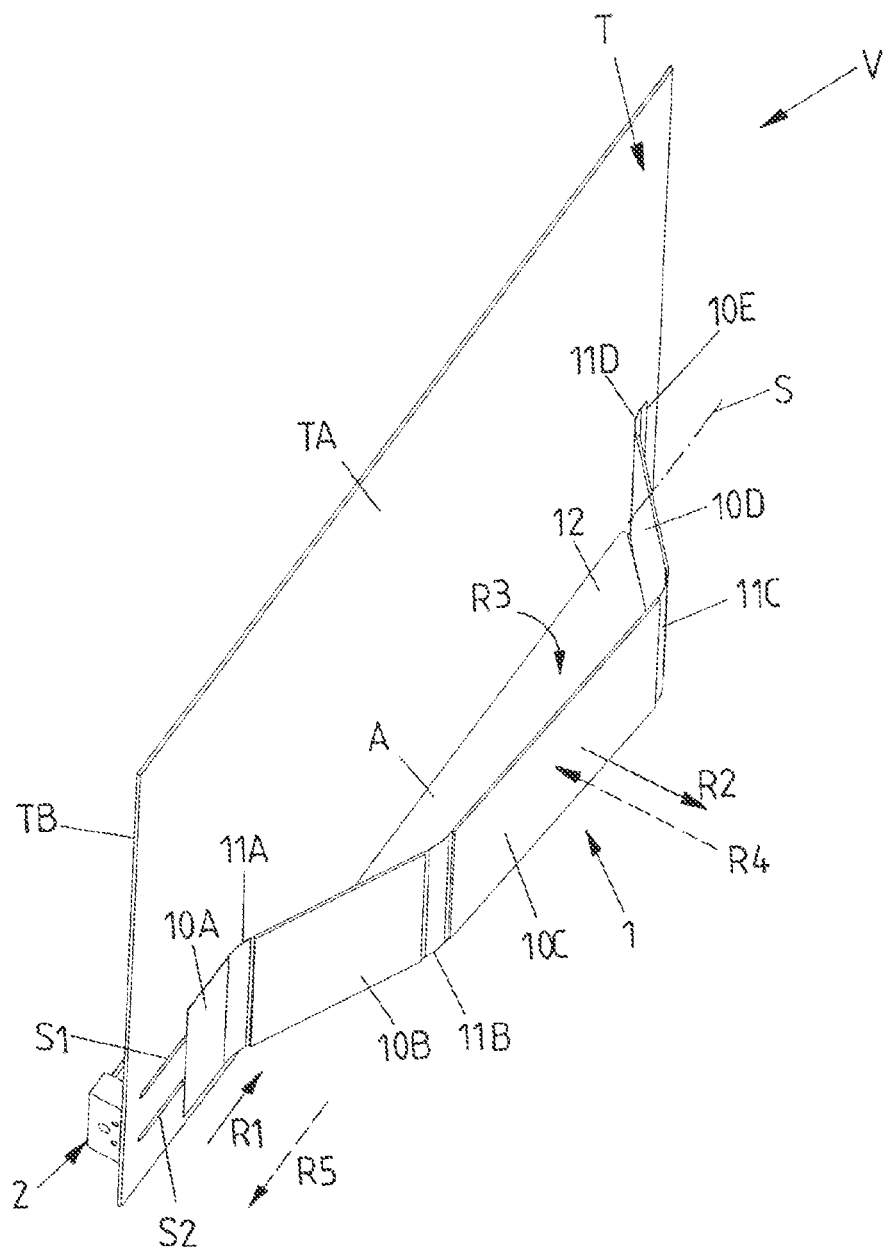

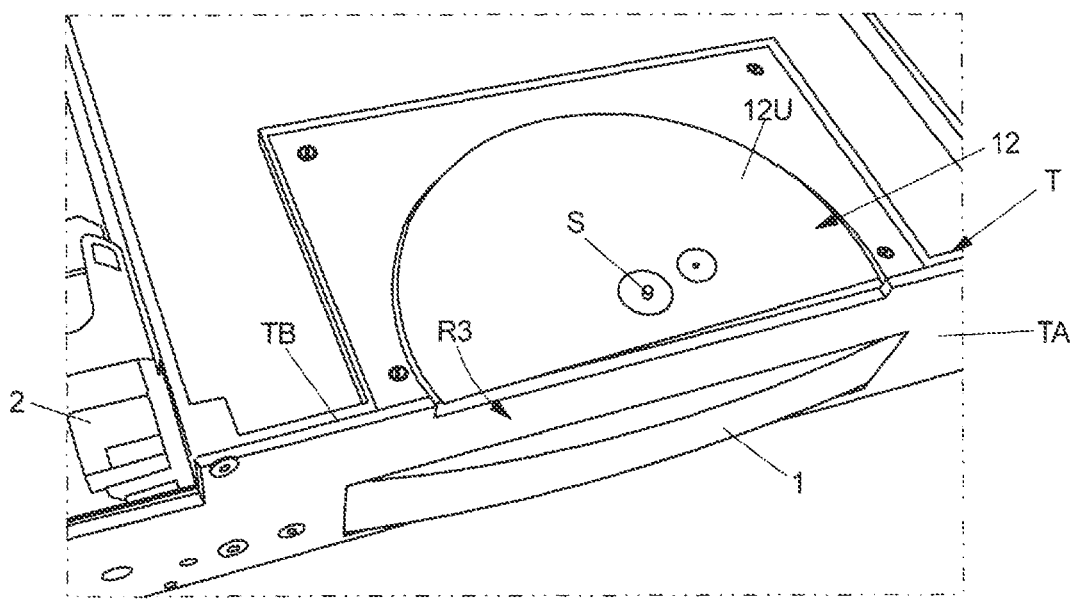
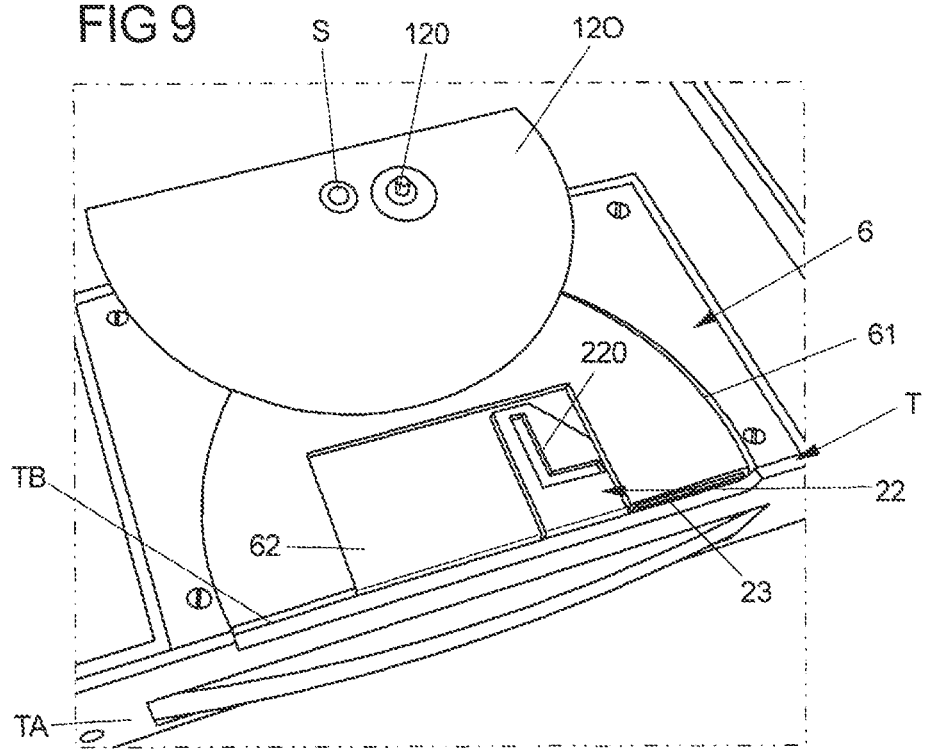

STOWAGE COMPARTMENT ASSEMBLY WITH EXTERNAL FORCE-ACTUATED WALL ELEMENT AND PIVOTABLE FLOOR ELEMENT

CROSS-REFERENCE TO RELATED APPLICATIONS

This application is the U.S. National Phase of PCT/EP2019/051563 filed Jan. 23, 2019, which claims priority to DE 10 2018 201 004.8 filed Jan. 23, 2018, the disclosures of which are hereby incorporated in their entirety by reference herein.

TECHNICAL FIELD

The present disclosure relates to a stowage compartment assembly for use in a vehicle.

BACKGROUND

Vehicles may include a stowage compartment for holding one or more objects. The stowage compartment may include a wall that may move relative to another component to form a storage area. The stowage compartment may be disposed in the vehicle interior and may be powered by a motor to move from a non-use position to a use position.

SUMMARY

One or more objects of the present disclosure may be to provide a stowage compartment assembly that improves ease of use and usefulness of a stowage space provided by an adjustable wall element.

According to a first embodiments, a stowage compartment assembly for a vehicle is provided. The stowage compartment may include a support element, a wall element that is arranged on the front side of the support element and that is adjustable between a non-use position and at least one use position, as well as a drive means for adjustment of the wall element by external force actuation, comprises at least one swivelably mounted base element, which is adjustable between an storage position and a functional position and, when the wall element is in the use position, is swiveled out of its storage position into its functional position and defines a base of the stowage space, which is formed by means of the wall element in its positions of use.

The proposed stowage compartment assembly thus provides a separate, swivelable and thus, for example, foldable base element to form a stowage space, having a base on which objects within the stowage space may be placed when the wall element is in a use position. A stowage compartment defining the stowage space thus has, in at least one use position of the wall element, in particular at least one side wall, formed by the wall element, and a base. If the wall element is adjusted into its non-use position, the base element is folded-in, and the wall element extends along the contour of the front side of the support element, i.e. runs parallel to it, for example. The wall element and the retracted or folded-in base element are thus compactly stowed on the support element.

The base element that defines the base of the stowage space may, in principle, be flexurally rigid, to enable objects to be placed securely on it.

In one or more embodiments, the base element is swivelably mounted on the support element. The base element, which may be swiveled between the storage position and the functional position, is thus swivelably mounted on the support element itself. This includes, in particular, an embodiment variant in which the base element may be swiveled on the support element about a swivel axis defined on the front side of the support element. For example, the base element is swivelably mounted by means of a hinge.

As an example, it is provided that the base element may be swiveled about a swivel axis that is substantially parallel to the front side of the support element. In particular, when the stowage compartment assembly is installed as intended, such a swivel axis may extend substantially along the vertical. As an example, the base element may be extended out of its storage position and into its functional position via the swivel axis extending parallel to the front side of the support element, below the wall element. For example, during the adjustment, the base element in this case is rotated from the storage position beneath the wall element into its functional position, such that, in the course of the adjustment movement, an increasingly larger section of the base element, on which an object may be placed, becomes extended. In the functional position, the extended base element then provides, for example, a maximum possible placement surface area.

In one or more embodiments, the base element in its storage position is accommodated in a gap formed between the wall element, is in its non-use position, and the support element. In particular, in this case the base element may be arranged completely and/or sandwiched between the wall element and the support element. For example, the base element is realized as a plate-type component and, when folded in its storage position, lies opposite an inner side of the retracted wall element, which is in its non-use position, such that the stowage compartment assembly realizes a very flat structure when the wall element is in its non-use position on the support element.

Alternatively or additionally, the base element in its functional position may bear against the wall element. If in this case the base element is accordingly in its functional position, it is in contact with the wall element, which is in a use position. This may be used to achieve stiffening of the stowage compartment defining the stowage space. In its functional position, the base element in this case may extend from an inner side of the support element toward an inner side of the wall element, which is in a use position, such that the base element counteracts a displacement of the wall element toward the support element by a force applied from outside (e.g. manually).

In one or more embodiments, the base element in its storage position is not accommodated in a gap between the wall element and the support element, but in its storage position is accommodated in an storage region located behind the front side of the support element. Such an storage region may be formed, for example, by a housing provided on the support element (on its rear side). From a corresponding storage region, the base element may then be extended, for example, into its functional position. For example, in further development, a flat and, for example, disk-shaped base element may be extended from a slot or gap on the front side of the support element.

As an example, in such an embodiment variant, the base element in its functional position may be spaced apart from the wall element. For example, there may thus be a gap between a lower edge of the wall element in its use position and the base element in its functional position.

In one or more embodiments, the base element is biased, such as elastically biased, into its functional position. As a result, a biasing force is applied to the base element, by means of which the base element is automatically adjusted into its functional position when the wall element no longer counteracts such an adjustment and is moved into a use position. In this way, for example, the drive means is then coupled only to the wall element, in order to adjust the wall element between the non-use position and at least one use position, by external force actuation. If the wall element, as a result of being brought into the use position, allows the base element to be shifted under the effect of the applied biasing force, the base element is automatically shifted in such a manner out of its storage position, toward its functional position. The base element in this case is then returned to the storage position, e.g. under the action of the wall element upon the base element and contrary to the biasing force. The wall element in this case thus acts in combination with the base element in such a manner that, upon an adjustment of the wall element (an adjustment of the wall element controlled, by external force actuation, by the drive means) in the direction of the non-use position—if necessary after travelling a predetermined minimum adjustment distance from the use position in the direction of the non-use position—the wall element acts upon the base element and, upon further displacement of the wall element, shifts the base element in the direction of its storage position, for example presses it in the direction of its storage position.

In one or more embodiments, the base element may be adjusted from an storage position into its functional position by means of a gate. Such a gate comprises, for example, at least one guide slot and at least one guide element guided on it in a sliding manner. The guide slot or the guide element in this case may be provided on the base element. For example, a guide element of the base element engages in a guide slot that may be adjusted by means of the drive mechanism. This includes that both the wall element and the base element are actuated by external force by the drive means, and may therefore be adjusted by motor. The drive means in this case acts on a guide element of the base element, for example via the adjusted guide slot, in such a manner that, by linear (translational) adjustment of the guide link, an adjustment path about the swivel axis for the base element is imposed upon the guide element sliding thereon, and the linear adjustment of the guide slot thus results in an adjusting movement of the base element about the swivel axis. Thus, by means of the gate, a translational adjusting movement of a drive element of the drive means is converted into a rotational or swivel movement of the base element.

In one or more embodiments, the wall element has a first (end) section, which may be adjusted by means of the drive means, and has a second (end) section, relative to which the first section may be adjusted, by means of the drive means, for the purpose of adjusting the wall element between its non-use position and a use position. While the first section is adjustable by means of the drive means, the second section may be fixed with respect to the support element, for example fixed to the support element. The drive means is thus coupled only to the first section of the wall element, in order to shift the first section with respect to the fixed, second section and thereby control an elastic deformation of the wall element. In this case, by means of the drive means, an elastic deformation of the wall element may consequently be controlled by adjustment of the first section with respect to the second, fixed section, in order to bend the wall element (to a greater extent) outward, away from the front side of the support element, in order to assume a use position.

As an example, it may also be provided that both a first and a second section of the wall element are adjustable by means of the drive means, for example (for the purpose of assuming a use position) toward each other and (for the purpose of assuming the non-use position) away from each other.

In principle, the wall element may be elongated, such as formed as a strip. An end section of an elongate wall element that is coupled to the drive means is thus provided at a longitudinal end of the wall element.

In an exemplary embodiment, a first section of the wall element, which may be adjusted by means of the drive means, may be displaced translationally on the support element. For example, the drive means has a linear guide for translationally adjusting the first section. Such a linear guide comprises, for example, a spindle drive.

In one or more embodiments, the drive means is provided, at least partially, on a rear side of the support element that faces away from the front side, for example is fixed to this rear side. Thus, for example, a linear guide of the drive means, for adjusting the first section of the wall element, may be provided on the rear side of the support element. The first section of the wall element, arranged on the front side of the support element, may in turn be coupled to a drive element of the drive means through at least one passage opening in the support element, in order concomitantly to drive the section of the wall element as a result of adjustment of this drive element.

In one or more embodiments, the wall element comprises a plurality of segments. These segments are then arranged, for example, in succession along a direction of longitudinal extent of the wall element. In one or more embodiments, the segments of the wall element are connected to each other in pairs via at least one elastically flexible bending region. The segments of the wall element in this case may consequently be designed so as to be stiff, or at least stiffer than the elastically flexible bending regions, such that, for bringing the wall element into a use position, a deformation of the wall element is selectively permitted only at the elastically flexible bending regions. The elastically flexible bending regions thus permit selective adjustability and regional elastic deformation of the wall element for the purpose of changing from the non-use position to a use position.

A (first or second) section of the wall element, which may be adjusted by means of the drive means, may in principle be formed in each case by a segment of a wall element that comprises a plurality of segments. In this case, for example, a first segment/a first (end) section of the wall element, which is coupled to the drive means, is adjoined, in a direction of longitudinal extent of the wall element, by an elastically deformable bending region and then by a further (stiffer) segment of the wall element.

In one or more embodiments, the wall element comprises at least one elastically deformable strip element, which may be curved outward, away from the contour of the front side of the support element, for the purpose of adjusting the wall element from its non-use position to a use position, preferably by means of the drive means. One end of a strip element in this case may be part of an adjustable first (end) section of the wall element, and another, second end of this strip element may be part of a second (end) section of the wall element that is fixed to the support element. An elastically deformable strip element may then be connected, for example, to a decor or trim component of the wall element that at least partially overlies or covers the strip element. In a further development, the wall element may also comprise a plurality of strip elements (at least two) that are parallel to each other and that are each elastically deformable.

In a possible further development, the at least one elastically deformable strip element is connected, on at least one section of the wall element, to at least one stiffening element, which locally counteracts deformation of the strip element. The connection of the strip element to at least one stiffening element, which locally counteracts deformation of the strip element and thus, for example, locally stiffens the strip element, may be used to predefine a certain shape of the resulting stowage space, and the associated subdivision of the wall element into elastically flexible bending regions, on the one hand, and stiffer segments, on the other hand. In this case, an elastically flexible bending region of the wall element, for example, is then defined in a region in which the elastically deformable strip element is not stiffened by a stiffening element. In a region in which a stiffening element is provided, and thus the strip element is not easily deformable, for example is not easily curved, there is accordingly a (stiffer/stiffer) segment of the wall element.

A further aspect of the proposed solution, which improves the ease of use of a proposed stowage compartment assembly, relates to the provision of at least one sensor means, by means of which an object in a region surrounding the wall element may be detected, and by means of which at least one signal may be generated, in dependence on which an adjustment of the wall element by means of the drive means may be controlled.

By means of the at least one sensor means and the signal generated by it, it is possible to indicate, for example, the presence of an object in the stowage space or in an adjustment path of the wall element. Alternatively or additionally, for example, a predefined operating event, for example in the form of a user gesture, may be detected by means of the signal. The aspect of the provision of a sensor means in this case is obviously independent of the equipping of a stowage compartment assembly with at least one swivelably mounted base element that may be adjusted between an storage position and a functional position. Clearly, however, a combination of both aspects is easily possible.

In one or more embodiments of a stowage compartment assembly equipped with at least one sensor means, an object in the stowage space, for example, may be detected by means of the at least one sensor means when the wall element is in a use position. Thus, for example, it may be detected, by means of the at least one sensor means, at least whether an adjustment of the wall element into its non-use position is blocked by an object located in the stowage space. Adjustment into the non-use position, actuated by external force, is therefore only possible in this case if no obstacle in the displacement path of the wall element could be detected by means of the at least one sensor means, and the stowage space of the stowage compartment formed in the use position of the wall element is empty.

On the basis of the fundamental concept that an object in the stowage space may be detected by means of a sensor means when the wall element is in a use position, in a further development it may also be provided, alternatively or additionally, that the wall element is deliberately adjusted in the direction of (but not into) its non-use position in order to fix by clamping in the stowage space an object that is located in the stowage space. In respect of this, the stowage compartment assembly may provide, for example, a set of control electronics, which is configured to adjust the wall element, in a use position, in the direction of its non-use position, in order to clamp an object located in the stowage space. In this way, when an object is detected in the stowage space, the wall element that has been moved in the direction of its non-use position may automatically fix the object in the stowage space in a clamping manner and thus hold it securely. A wall element that is elastically deformable, at least section wise, may in this case consequently be tensioned (to a greater extent) by the drive means in order to clamp at least one object in the stowage space. The drive means may be controlled, for example, to at least slightly adjust the wall element in the direction of the non-use position, and thus to adjust it over only part of the possible adjustment path to attainment of the non-use position.

For example, the wall element may first be brought from a non-use position to a use position. After an object has been placed in the resulting stowage space, the placement of the object in the stowage space is identified by means of at least one sensor means and, in response to this, the wall element is moved a little in the direction of its non-use position. The wall element in this case may bear against the object located in the stowage space, and automatically clamp the object between an inner side of the wall element and the front side of the support element.

For the detection of an object by means of the at least one sensing device, the at least one sensing device may comprise, for example, capacitive or inductive sensors.

A set of control electronics of the stowage compartment assembly may, for example, be configured, for example, to block a (complete) adjustment of the wall element, in a use position, into its non-use position, if an object in the stowage space is detected by means of the at least one sensor means. The wall element is thus in this case prevented from being brought, by external-force actuation, into its non-use position by means of the at least one sensor means in order, for example, to prevent a part of the body of a person from being trapped by the retraction of the wall element, and to prevent damage to an object located in the stowage space. Based on the embodiment variant explained above, an adjustment in the direction of the non-use position may be triggered in order to secure in a clamping manner in the stowage space, by means of the wall element, an object that is detected in the stowage space. However, a complete adjustment of the wall element into its non-use position is blocked.

Alternatively or additionally, an object in front of the wall element may be detected by means of at least one sensor means. In other words, an object outside the stowage space and, for example, adjacent to an outer side of the wall element defined by the wall element, may be detected by means of the at least one sensor means. Thus, for example, a possible obstacle in the adjustment path of the extending wall element, which is thus to be adjusted in the direction of a use position, may be detected by means of the at least one sensor means.

Alternatively or additionally, in such an embodiment variant an adjustment of the wall element may be able to be triggered only by means of at least one sensor means. Thus, for example, an operating event, for example a gesture performed as intended by a user in front of the wall element, may be detected contactlessly by means of the at least one sensor means in order to trigger an adjustment of the wall element into the non-use position and/or into a use position. For example, it is possible that, by means of the at least one sensor means and the set of control electronics coupled thereto, a gesture performed in front of the wall element by the hand of a user, for example a swiping gesture, may be detected, and evaluated to the effect that this triggers the extension, and thus the adjustment of the wall element into a use position or, conversely, the retraction, and thus the adjustment of the wall element into its non-use position.

A further aspect of the proposed solution relates to a method for adjusting a wall element of a stowage compartment assembly by external force actuation.

In this case, also, the wall element is arranged on the front side of a support element, and is adjustable between a non-use position and at least one use position. In the non-use position, the wall element extends along a contour of the front side of the support element, while in its use position, for the purpose of forming a stowage space for at least one object, the wall element projects with at least one section from the front side of the support element and is elastically deformed, at least section wise. For example, in its use position, the wall element is curved outward, away from the contour of the front side. The proposed method additionally provides that an adjustment of the wall element is dependent on at least one signal of at least one sensor means, by means of which an object in a region surrounding the wall element may be detected. Thus, in this case, an adjustment of the wall element by means of the drive means may consequently be made dependent on the presence of an object in the stowage space or in an adjustment path of the wall element, and/or on the contactless identification of a predefined operating event—for example in the form of a gesture. In connection with a corresponding embodiment variant of a stowage compartment assembly equipped with at least one sensor means, features and advantages explained above and in the following thus also apply to embodiment variants of a proposed method, and vice versa.

A proposed stowage compartment assembly may be provided in a vehicle, for example on a vehicle door, in a trunk, on a rear side of a seat back, or on a dashboard of the vehicle. In respect of this, a support element may be formed, for example, by a trim component of the vehicle door, or of the trunk, by the seat back, or by the dashboard of the vehicle.

BRIEF DESCRIPTION OF THE DRAWINGS

The appended figures depict, as examples, possible embodiment variants of the proposed solution.

There are shown:

FIG. 1A an embodiment variant of a proposed stowage compartment assembly, having a wall element in a non-use position bearing against the front side of a support element;

FIG. 1B the stowage compartment assembly of FIG. 1A with the wall element in a use position, in which a stowage compartment, having a stowage space for receiving objects, is formed by the wall element and a folded base element;

FIG. 8 a detail of a housing of the stowage compartment assembly of FIGS. 7A to 7C, in a non-installed state, as viewed toward an underside of the base element, which is retracted and thus in its storage position on the housing;

FIG. 9 the housing with the base element removed;

DETAILED DESCRIPTION

Figure 2:
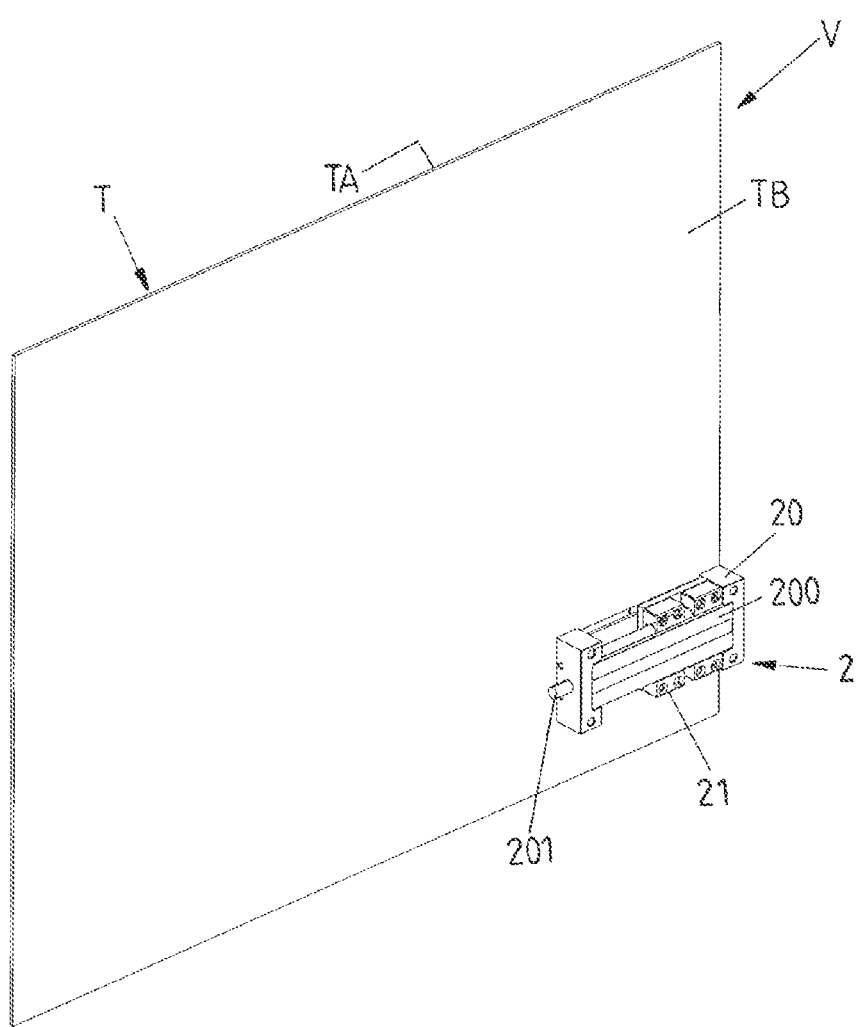
FIG. 2 a perspective view of a rear side of the stowage compartment assembly, with a drive means for adjustment of the wall element.
Figure 3:
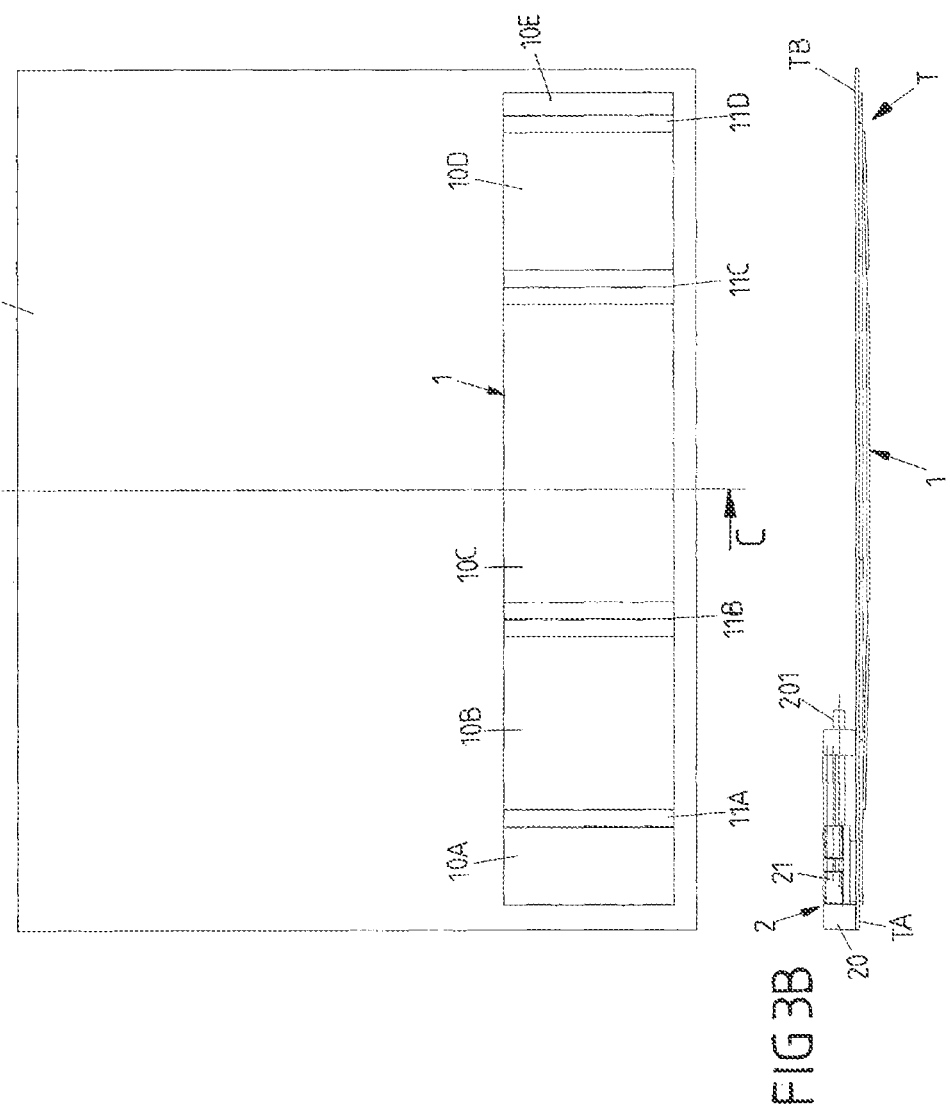
FIGS. 3A-3C the stowage compartment assembly with the wall element in its non-use position, in various views.
Figure 4:
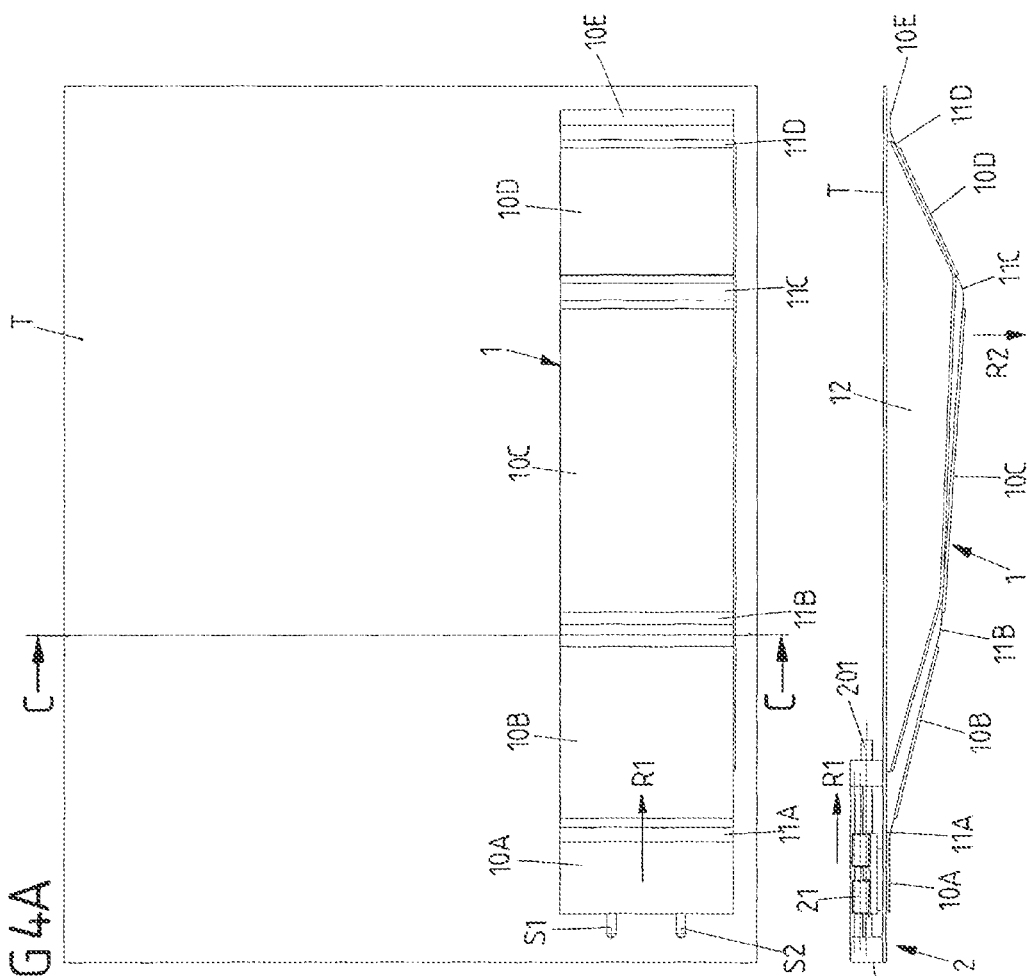
FIGS. 4A-4C views corresponding to FIGS. 3A to 3C of the stowage compartment assembly with the wall element as it is being brought from the non-use position into a use position.
Figure 5:
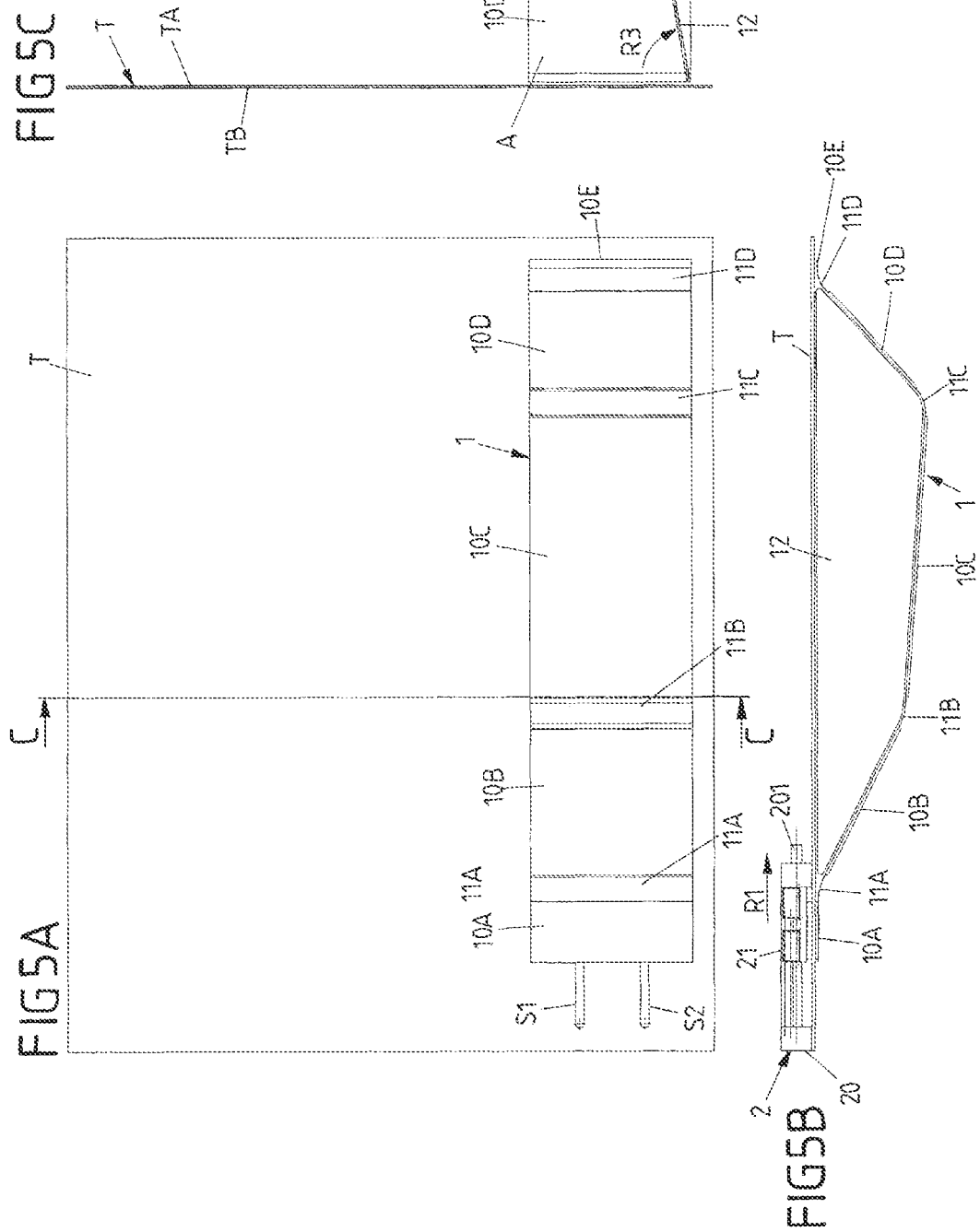
FIGS. 5A-5C views corresponding to FIGS. 3A to 3C of the stowage compartment assembly with the wall element in the use position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A stowage compartment assembly having a support element, and having a wall element that is arranged on a front side of the support element and that is adjustable between a non-use position and at least one positions of use, is known, for example, from DE 10 2016 102 903 A1. The wall element in this case is defined by an elastic, elongate bending element that, in the non-use position, extends along a contour of the front side of the support element and, in the use position, projects from the front side of the support element, in that the elastic bending element curves outward away from the contour of the front side of the support element. A drive means, having a drive motor, is provided for adjustment between the non-use position and the use position. Such a stowage compartment assembly allows the wall element to be retracted in a space-saving manner in the non-use position, and to project as little as possible, or not at all, from the front of the support element, for example an interior trim of the vehicle. In a use position, in which the wall element curves outward, a stowage space, which is accessible through the wall element that is in the use position, can be used to receive an object. In DE 10 2016 10 209 03 A1 it is particularly emphasized that, in the use position of the wall element, a stowage compartment that is present in any case is made accessible. By means of the outwardly curved wall element that is in the use position, an opening is accordingly defined that allows access to the stowage compartment. In the non-use position, the stowage compartment, or the corresponding opening, is closed.

FIGS. 1A to 5C show different views and positions of a wall element 1 a stowage compartment assembly V, in which a stowage compartment can be formed on a support element T as required by adjustment of the elongate wall element 1. The support element T is represented in FIGS. 1A to 5C as a flat component. This may be, for example, an interior trim component of a vehicle door. However, the support element may also be part of a trunk lining, part of a rear side of a seat back, or part of a dashboard of a vehicle.

The support element T has a front side TA that faces, for example, an interior of the vehicle or a stowage space of the vehicle. The elongate wall element 1 is arranged on this front side TA. In the non-use position represented in FIG. 1, the wall element 1 in this case extends along a contour of the front side TA of the support element T, and is in this case parallel to the front side TA. The wall element 1 is realized in the form of a strip and, in the non-use position, projects only slightly from the front side TA of the support element T.

The wall element 1 in the present case is composed of a plurality of segments 10A, 10B, 10C, 10D and 10E, which are connected to each other in pairs via elastically flexible regions 11A, 11B, 11O and 11D. A first segment 10A of the wall element 1 at a first longitudinal end of the wall element 1 is coupled to a drive means 2, which is arranged on a rear side TB of the support element T. A second segment 10E forming the other longitudinal end of the wall element 1 is immovably fixed to the front side TA of the support element T. The wall element 1 is elastically deformable, at least section wise, for example via the elastically flexible bending regions 11A, 11B, 11C and 11D, to enable it to be adjusted from the flat non-use position, represented in FIG. 1A, to a use position, represented in FIG. 1B. In this use position, the wall element 1 with the middle segments 10B, 10C and 10D is curved outwards away from the contour of the front side TA of the support element T and defines, between itself and the front side TA of the support element T, a stowage space A in which objects can be placed.

For the purpose of adjustment of wall element 1, by external force actuation, from the non-use position to a use position and vice versa, the first segment 10A is displaceably guided on the support element T, and can be displaced translationally by the drive means 2. If the first segment 10A is adjusted, by means of the drive means 2, along a drive direction R1 in the direction of the fixed, second (end) segment 10D of the wall element 1, the wall element 1 automatically curves outward, via its intermediate segments 10B to 10D, this being substantially along an adjustment direction R2 that is perpendicular to the drive direction R1 and the front side TA of the support element T.

For the purpose of guiding the first segment 10A on the support element T, formed on the support element T there are two through-openings in the form of mutually parallel slots S1 and S2. Engaging through these slots S1 and S2 is a connection element, via which the first segment 10A is connected to a drive element in the form of a displaceably guided slide 21 of the drive means 2 (see, for example, FIG. 2). The wall element 1 can be extended or retracted as a result of the segment 10A being displaced, along the slots S1 and S2, toward the fixed segment 10D or away from the fixed segment 10D. If the stowage compartment, with the stowage space A, is not required for accommodating objects, the wall element 1 can be brought back into the non-use position represented in FIG. 1A to save space.

To enable objects to be easily placed within the stowage space A when the wall element 1 is in the use position, the stowage compartment assembly V may include a swivelably mounted plate-type, flexurally rigid base element 12. This base element 12 is mounted on the support element T so as to be swivelable about a swivel axis S, for example by means of at least one hinge. In the non-use position of the wall element 1 represented in FIG. 1, the base element 12 is folded in the direction of the front side TA of the support element T, and is accommodated in a gap between the front side TA and the retracted wall element 1, which is in its non-use position. In this case, the base element 12 is completely covered by the wall element 1. From an storage position of the base element 12 defined in this way, the base element 12 can automatically fold outward, about the swivel axis S, along a swivel direction R3 when the wall element 1 is brought into a use position as shown in FIG. 1B. The base element 12 is then no longer prevented by the wall element 1 from swiveling along the swivel direction R3, and accordingly folds automatically in the direction of its functional position when the wall element 1 is brought into a use position. In the functional position, the base element 12 then forms a base of the stowage space A, on which objects can be placed.

A connection between the wall element 1 and the base element 12 may be provided, for example by means of at least one flexible tractive means, for folding the base element 12 over from its storage position into the functional position. In this way, the wall element 1, adjusted in the direction of a use position, can exert a tractive force upon the base element 12 in order to fold the base element 12 from its storage position into the functional position when the wall element 1 is adjusted in the direction of a use position. Alternatively or additionally, the base element 12 may fold automatically under its own weight from the storage position into the functional position when the wall element 1 is folded into its use position. If necessary, the base element 12 may also be elastically biased into its functional position, for example by at least one spring element. A spring element for elastically biasing the base element 12 may in this case be supported, for example, on the one hand on the support element and on the other hand on the base element 12. In the folded-out functional position, the base element 12 bears against the inside of the wall element 1 and thus stiffens the stowage compartment formed with it.

If, by means of the drive means 2, the first segment 10A is adjusted away from the fixed, second segment 10E, and the wall element 1 is thus adjusted in the direction of its non-use position, the wall element 1 is adjusted, for example with its central segment 10C, in the direction of the front side TA of the support element T, along an adjustment direction R4. The wall element 1 in this case acts upon the base element 12, such that the base element 12 is pressed by the wall element 1 in the direction of the front side TA of the support element T, and is thereby swiveled back, about its swivel axis S, into the storage position. If consequently the first segment 10A is adjusted by the drive means 2 in a drive direction R5, which is opposite to the drive direction R1 for extending the wall element 1, the base element 12 also folds automatically into its storage position. When the wall element 1 has been brought completely into the non-use position as shown in FIG. 1, the base element 12 is again sandwiched between the front side TA of the support element T and the wall element 1.

The wall element 1 may in principle be formed with a strip-type elastically deformable strip element. An elastically deformable strip element is produced, for example, from a spring steel. To form the stiff segments 10A to 10E, such a strip element is connected to a stiffening element and provided, for example, with a decor or trim component in order to visually match an outer side of the wall element 1 to the front side TA of the support element T. The stiffening elements are only locally attached to the strip element, such that between two pairs of adjacent segments 10A/10B, 10B/10C, 10C/10D and 10D/10E there are free, non-stiffened regions which, as elastically deformable bending regions 11A to 11D, determine the shape of the stowage compartment when the wall element 1 is in the use position and allow the wall element 1 to bend outward into a use position.

As shown by FIG. 2, the drive means 2 is fixed to the rear side TB of the support element T. In the embodiment variant represented, the drive means 2 has a linear guide that may include a spindle drive. Fixed to the rear side TB of the support element T in this case is a support frame 20, which forms a slide guide 200 for a displaceably mounted drive element in the form of a slide 21. The slide 21 is fixedly connected to the first segment 10A of the wall element 1, such that a displacement of the slide 21 along the support frame 20 results directly in a corresponding displacement of the first end segment 10A relative to the fixed, second end segment 10E of the wall element 1.

An adjustment of the slide 21 in this case may be driven by means of a spindle 201 meshing with a spindle nut of the slide 21. The spindle 201 in this case may be driven, for example, by an electric motor for the purpose of rotating it about its spindle axis in order to position the slide 21—depending on the direction of rotation of spindle 201—along the drive direction R1 or R5.

FIGS. 3A to 3C, 4A to 4C and 5A to 5C show the wall element 1 being brought from a non-use position, represented in FIGS. 3A to 3C, via an intermediate position 1, represented in FIGS. 4A to 4C, into a non-use position of the wall element 1, represented in FIGS. 5A to 5C. FIGS. 3C, 4C and 5C in this case each show a section along a section line C-C represented in FIG. 3A, 4A or 5A.

Extension of the wall element 1 from its flat non-use position into a use position, in which the wall element 1 projects on the front side TA of the support element T, may be controlled, for example, by means of a set of control electronics 5 coupled to the drive means 2. This set of control electronics 5 may be coupled to a sensor means 4.1, 4.2 and 4.3 represented in FIG. 1A. Such a sensor means 4.1, 4.2 or 4.3 has, for example, at least one capacitive or inductive sensor to enable contactless detection of an object in a region around the wall element 1.

In the case of the embodiment variant of FIG. 1A, a plurality of sensor means 4.1, 4.2 and 4.3 are provided on different (here middle) segments 10B, 10C and 10D of the wall element 1, for example integrated therein. A sensor means 4.1, 4.2 and 4.3 is able to generate at least one (sensor) signal, depending on which, by means of the set of control electronics 5, an adjustment of the wall element 1 is controlled via the drive means 2. In this case, one or more signals of the sensor means 4.1-4.3 may be used to indicate, for example, the presence of an object in the stowage space A (with the wall element 1 extended) or in an adjustment path of the wall element 1 (while or before being brought into a use position of the wall element 1). Alternatively or additionally, an operating event may be detected contactlessly by means of one or more signals of the sensor means 4.1-s4.3, for example, as a result of which an adjustment of the wall element 1 is triggered.

Thus, for example, it may be possible to detect, by means of at least one sensor means 4.1, 4.2 or 4.3, after the wall element 1 has been shifted into a use position, whether an object is placed in the stowage space A of the formed stowage compartment. If the placement of an object in the stowage compartment A is detected by sensor, the wall element 1 is automatically shifted in the direction of (but not into) its non-use position. This causes the wall element 1, which is section wise elastically deformable, to be tensioned and its middle segments 10B to 10D to be displaced in the direction of the front side TA of the support element T. As a result, an object located in stowage space A is pressed by the wall element 1 against the front side TA and clamped in the stowage space A. The object is thus secured against accidentally falling out of the stowage space A.

Alternatively or additionally, at least one sensor means 4.1, 4.2 or 4.3 may be used to detect an object in the stowage space A, in order to prevent the respective object from being damaged by any adjustment of the wall element 1 to its non-use position triggered by a user. If an object is detected in the stowage space A, the set of control electronics 5 blocks (complete) adjustment of the wall element 1 into its non-use position. At least one of the sensor means 4.1, 4.2, 4.3 in this case is thus part of an anti-trap protection device provided by the set of control electronics 5.

Alternatively or additionally, operating events for adjusting the wall element 1 may be detectable by means of the sensor means 4.1, 4.2 or 4.3 (or a plurality of the sensor means 4.1, 4.2 and 4.3). For example, a gesture performed by a user in front of the wall element in the non-use position may be detectable and evaluated as an operating event for extending the stowage compartment. If a permissible operating event is consequently identified by means of the set of control electronics 5, the drive means 2 is activated to extend the wall element 1 and, by folding out the base element 12, to provide the stowage compartment with the stowage space A. Likewise, when the stowage compartment is extended, a gesture performed in front of the wall element 1 in its use position may be detectable, as a result of which the wall element 1 is brought back into its non-use position, actuated by external force, and is thus retracted.

Figure 6:
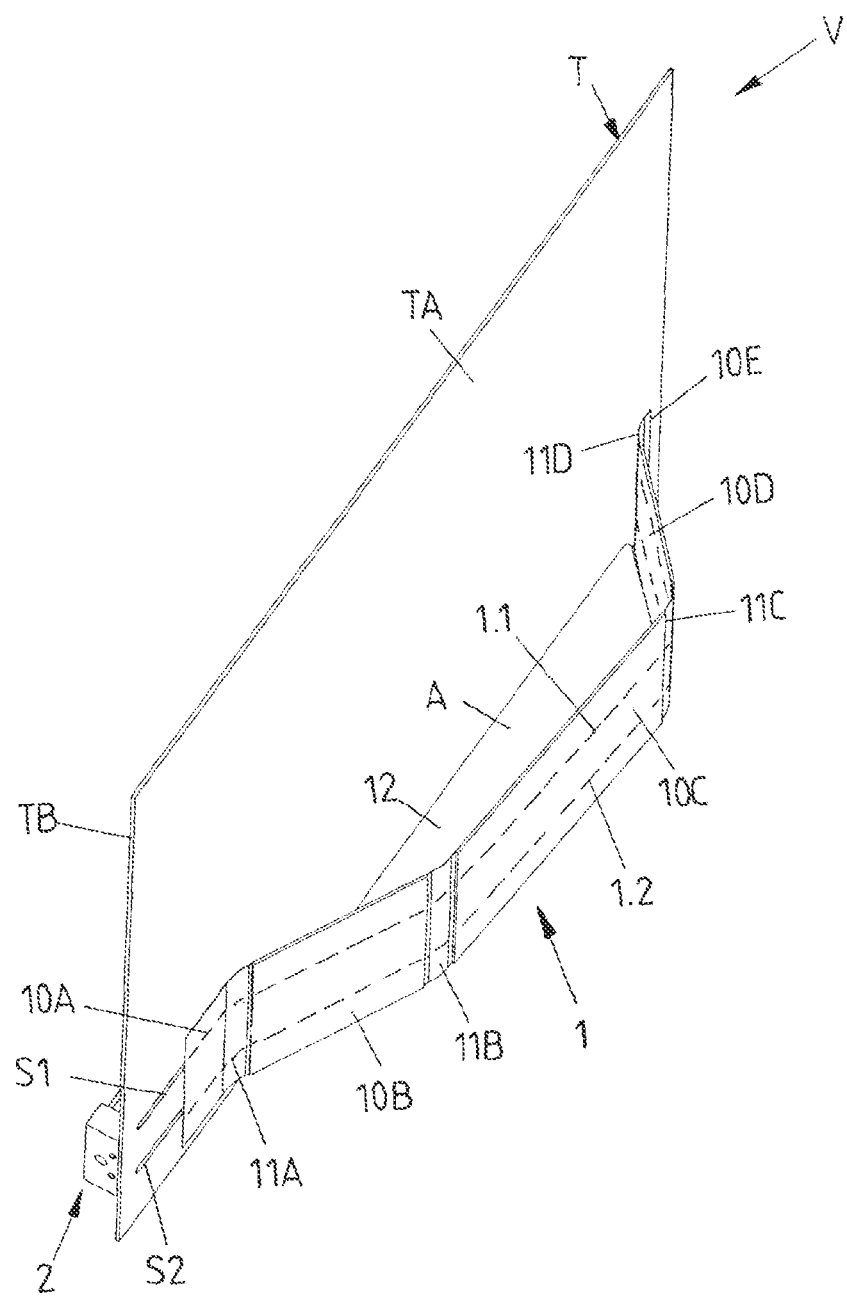
FIG. 6 view corresponding to FIG. 1B of a further embodiment variant of a stowage compartment assembly.

As represented as an example in FIG. 6, the construction of wall element 1 from a continuous elastically deformable strip element having local stiffeners is clearly not essential. In the case of the embodiment variant represented in FIG. 6, a plurality of mutually parallel, elastically deformable strip elements 1.1 and 1.2 are provided in the wall element 1. These strip elements 1.1 and 1.2 form the elastically flexible bending regions 11A to 11D. The stiff segments 10! to 10E of the wall element 1 are formed in the region of flat stiffeners, which counteract an elastic deformation of strip elements 1.1 and 1.2.

Figure 7A:
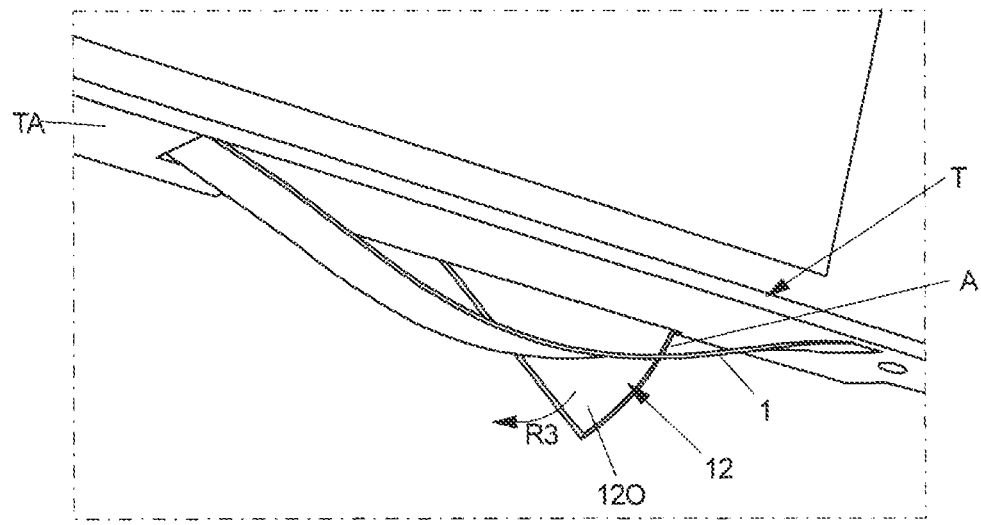
FIGS. 7A-7C in each case a perspective top view of different phases during the adjustment of a wall element into its use position, and of a base element into its functional position, in the case of a further embodiment variant of a proposed stowage compartment assembly.
Figure 7B:
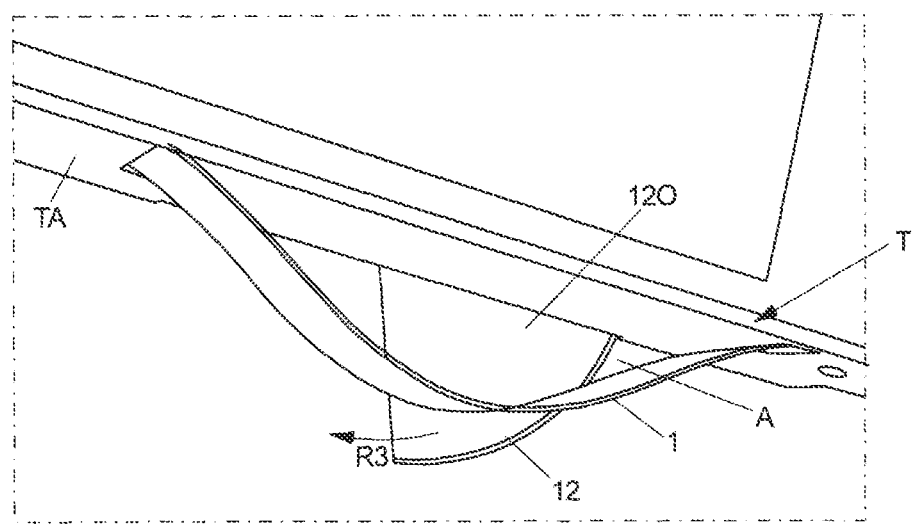
Figure 7C:
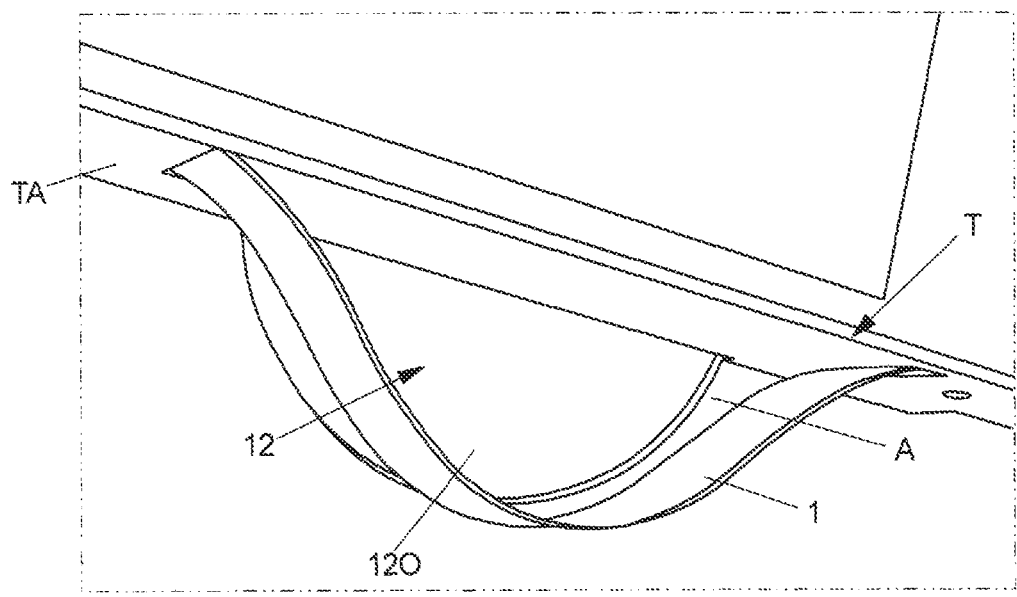

FIGS. 7A to 7C, 8, 9 and 10A to 10C show a further embodiment variant of a proposed stowage compartment assembly, in which a swivelably mounted base element 12 can be adjusted between an storage position and a functional position in order to define a base of a stowage space A when a strip-type wall element 1 is in a use position. For adjustment of the wall element 1 of the stowage compartment assembly of FIGS. 7A to 10C, at least one sensor means 4.1, 4.2, 4.3 may also be provided in order to detect an object in a region surrounding the wall element 1. As an example, the wall element 1 of the embodiment variant of FIGS. 7A to 7C is realized as a flexible strip, for example as a spring-steel strip. The flexible wall element 1 may, for example, be coated and/or covered, for example covered with an additional trim component that can be displaced with the wall element 1, on at least one section.

In contrast to the embodiment variant described above, when the base element 12 is in an extended state, defining the functional position of the base element 12, a stowage compartment assembly of FIGS. 7A to 10C provides a spacing from the wall element 1 in the use position. A swivel axis S of the base element 12 of FIGS. 7A to 10C also extends substantially perpendicularly in relation to a swivel axis S of the embodiment variant of FIGS. 1A to 6. When the stowage compartment assembly is installed as intended, the swivel axis S of the embodiment variant of FIGS. 7A to 10C consequently extends along a vertical. The base element 12 in this case is not necessarily swivelably mounted on the front side TA of the support element 1. The base element 12, during adjustment from the storage position into its functional position, can be rotated via the swivel axis S in such a manner that, in the course of the adjusting movement of the base element 12 into its functional position, an increasingly larger section of the base element 12, on which an object can be placed, becomes extended. Consequently, an increasing section of an upper side 12O of the base element 12 is extended at the front side TA of the support element T in the course of the adjusting movement.

The base element 12 of the embodiment variant of FIGS. 7A to 10C is disk-shaped, and in this case has a semi-circular cross-sectional area. During an adjustment of the base element 12 from its storage position, in which the base element 12 is accommodated in a completely concealed manner behind the front side TA of the support element T, into the functional position, in which a maximum possible placement surface area is provided by the upper side 12O of the base element 12, the disk-shaped base element 12 is thus rotated out of the support element T until, in the functional position, it projects to a maximum extent below the wall element 1 from the front side TA of the support element T. In the embodiment variant represented, the base element 12 can be extended through a slot on the support element T.

In its storage position, the disk-shaped base element 12 is accommodated in an storage region 61 of a housing 6 of the stowage compartment assembly that is represented in FIGS. 8 and 9. This storage region 61 is realized, for example, by a recess 61 in a housing wall of the housing 6, such that the base element 12, when in its retracted storage position, is arranged in a protected manner thereon. An underside 12U of the base element 12 that is opposite the upper side 12O of the base element 12 can then also be flush, for example surface-flush, with the housing wall of housing 6 that may include the recess 61.

In its storage position, the base element 12 completely covers a driver 22 of a transmission mechanism, by means of which the base element 12 can also be adjusted, actuated by external force, via the drive means 2. The driver 22 in this case is fixed to, e.g. formed on, a connection element in the form of an elongate connection strip 23 of the transmission mechanism. The connection strip 23 can be adjusted in a straight line along the rear side TB of the support element T, by means the drive means 2. During a straight adjusting movement of the connection strip 23, which is motor-driven by the drive means 2, the driver 22 is driven concomitantly and thus also adjusted longitudinally.

Figure 10B:
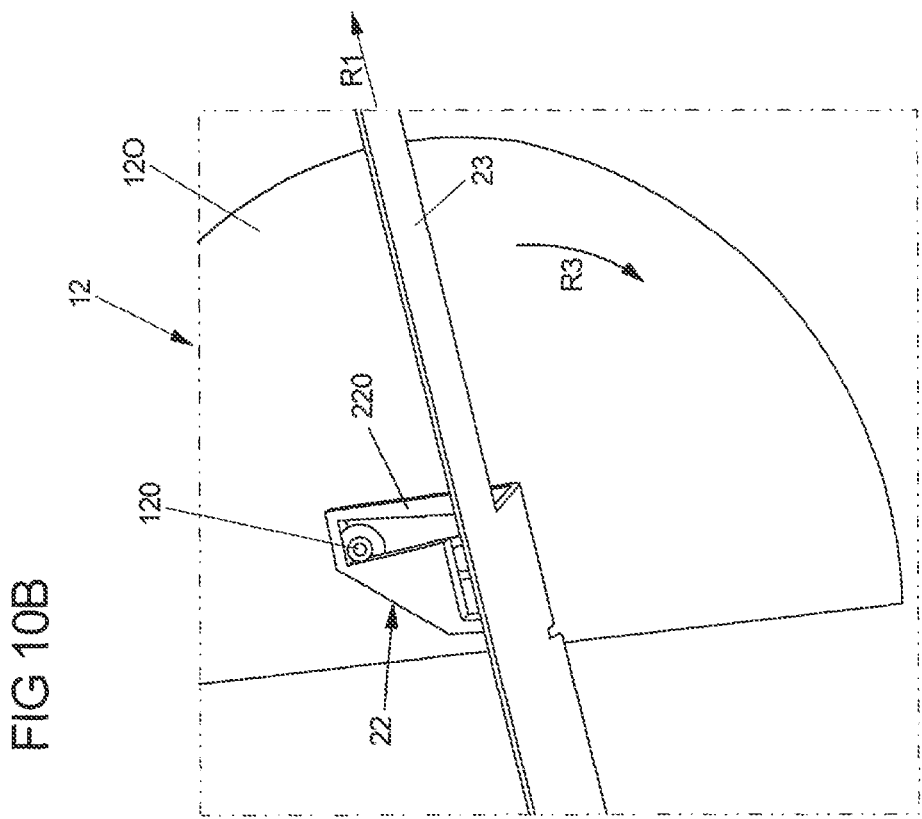
FIGS. 10A-10C details of an adjustment mechanism, with gate for adjustment of the base element of the stowage compartment assembly of FIGS. 7A to 9 during adjustment of the base element into the functional position.
Figure 10A:
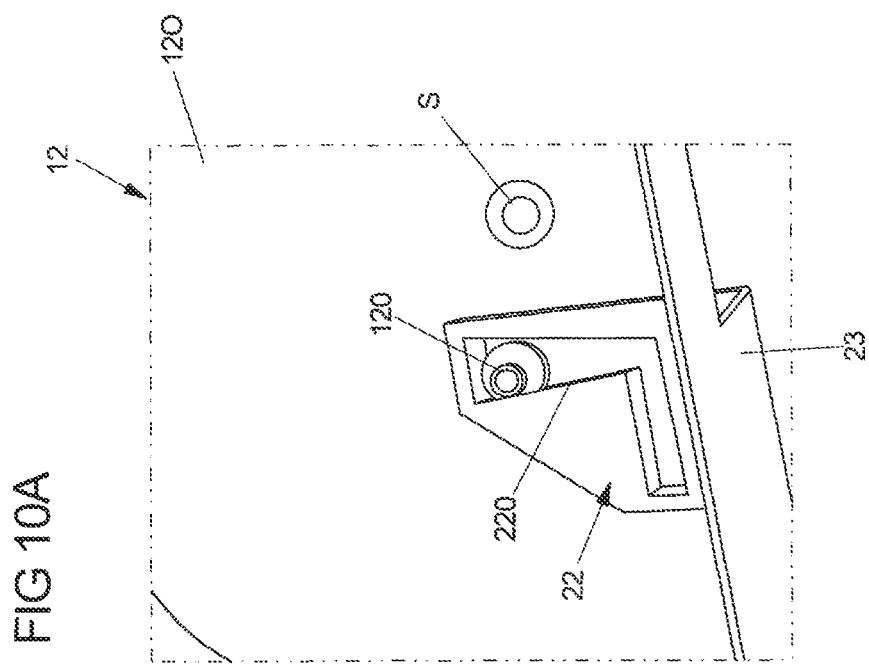
Figure 10C:
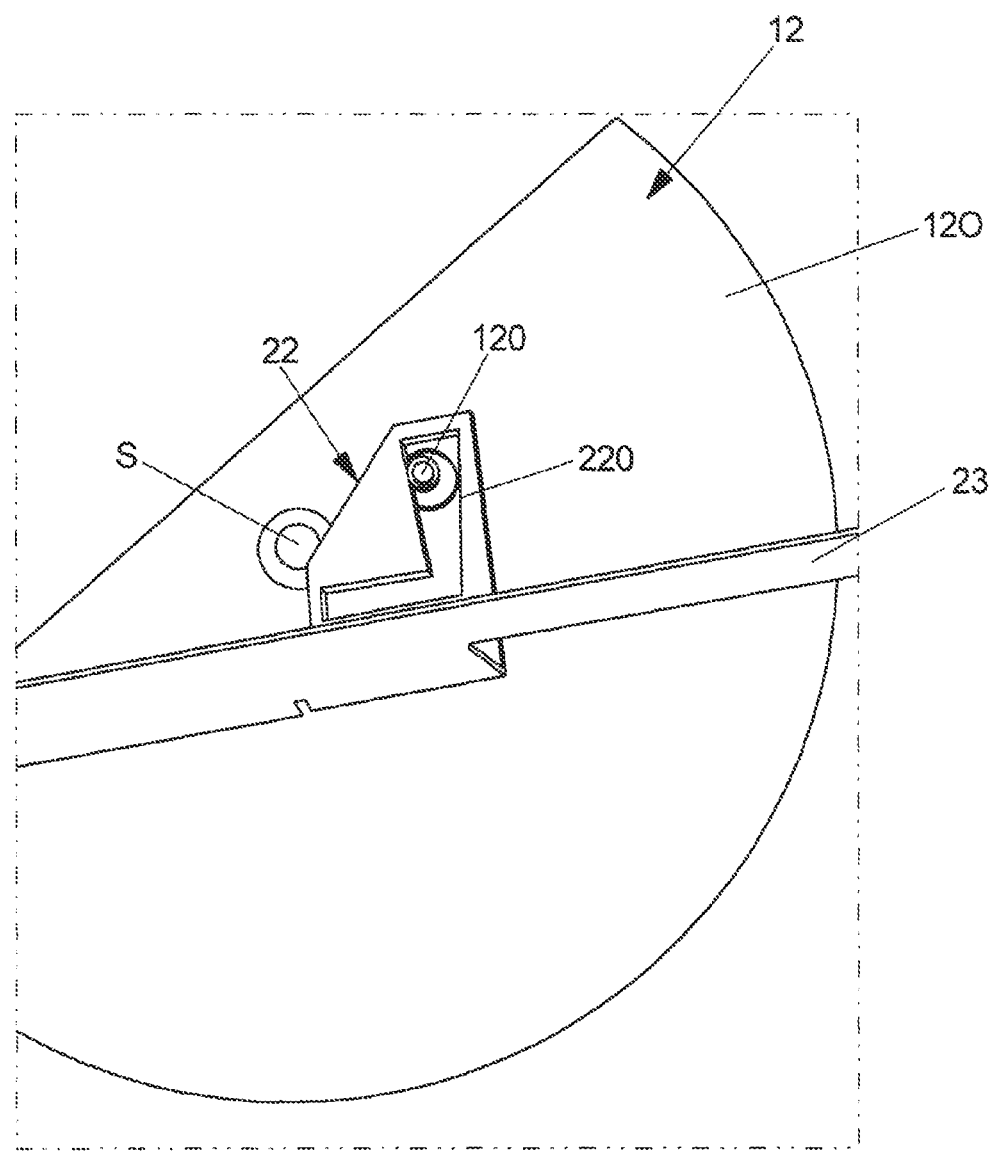

The driver 22, during an adjustment, via a guide slot 220 formed on it, concomitantly drives as a guide element a guide pin 120 that projects on the underside 12U of the base element 12. As illustrated by FIGS. 10A, 10B and 10C for successive phases of an adjustment, a longitudinal displacement of the driver 22 imposes a swiveling movement, about the swivel axis S, upon the guide pin 120, which is displaceably guided in the guide slot 220. As a result, the base element 12, which is non-rotatably connected to the guide pin 120, is also rotated about the swivel axis S and—depending on the drive direction R1 or R5, in which the connection strip 23 is adjusted by motor—the base element 12 is extended or retracted on the front side TA of the support element T. Together with the guide pin 120 of the base element 12, the guide slot 220 of the driver 22 thus forms a gate, via which the base element 12 can be adjusted from its storage position to its functional position and, conversely, from its functional position to its storage position.

In the embodiment variant represented in FIGS. 7A to 10C, the drive means 2 thus drives both the wall element 1 and the base element 12. Via the transmission mechanism, which includes, inter alia, the connection strip 23 and the driver 22, the slide 21 of the drive means 2, for example, consequently drives both the wall element 1 and the base element 12. An adjustment force, generated by motor by the drive means 2 and acting in a straight line, is thus used to adjust both components of the stowage compartment assembly.

In the embodiment variant represented, for example according to FIG. 9, the plate-type driver 22, angled perpendicularly from the connection strip 23, is present, guided in an storage region in the form of a recess 62, on the housing wall of the housing 6, on which the base element 12 is also rotatably mounted. The connection strip 23 can thus be guided in a longitudinally displaceable manner in a gap between the rear side TB of the support element T and the housing 6, and with the driver 23 angled away from it can project into the recess 62 of the housing 6. The driver 22 with its guide slot 220 is displaceably mounted in the recess 62, a longitudinal extent of the recess 62 (more precisely, the mutually facing inner walls of the recess 62 that define this longitudinal extent) defining an admissible adjustment path of the driver 22, and thus of the connection strip 23, along the support element T. As the driver 22 cannot be adjusted beyond one of the two mutually facing inner walls of the recess 62, the possible end positions of the base element 12 are predefined by means of the recess 62.

The recess 62 for the driver 22 in this case is provided within the recess 61 for the base element 12, but in this case is set back in relation to a bearing surface of the recess 61 that faces toward the base element 12. This allows the driver 22 to be arranged between the housing wall and the base element 12, which in turn supports a compact design of the stowage compartment assembly.

The proposed solution allows a space-saving and aesthetically pleasing arrangement of a stowage compartment which, when not in use, forms—if necessary parallel to the inner side TA of the support element T—a flat surface. The stowage compartment can be made available, actuated by external force, only when required, i.e. when wanted by a user, by outward curving of the wall element 1, which is elastically deformable, at least section wise. In this case, the stowage compartment, by means of the folded-out base element 12, has a stowage-compartment base, which prevents objects placed in the resulting stowage space A from falling through. At the same time, folding-out of the base element 12 stiffens the stowage compartment provided. This consequently provides a transformable stowage compartment that is very convenient to use. At least one sensor means 4.1, 4.2 or 4.3 may be used in this case to provide additional operating convenience in order to automatically ensure that objects placed in the stowage space A are fixed in place, to prevent unwanted jamming of body parts and objects and/or to contactlessly control the adjustment of the wall element 1.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCES 1 wall element
1.1, 1.2 strip element
10A-10E segment
11A-11D bending region
12 base element
120 guide pin (guide element)
12O upper side 12U underside
2 drive means
20 support frame
200 slide guide
201 spindle
21 slide (drive element)
22 driver
220 guide slot
23 connection strip (connection element)
4.1, 4.2, 4.3 sensor means
5 set of control electronics
6 housing
61, 62 recess (storage region)
A stowage space
R1, R5 drive means
R2, R4 adjustment direction
R3 swivel direction
S swivel axis
S1, S2 slot
T support element
TA front side
TB rear side
V stowage compartment assembly While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A stowage compartment assembly for use in a vehicle, the stowage compartment assembly comprising:
   a support element having a front side defining a contour;
   a wall element disposed on a front side of the support element and adjustable between a non-use position and a use position, wherein when the wall element is in the non-use position, the wall element extends along the contour, and when the wall element is in the use position, a first section of the wall element is elastically deformed and projects from the front side of the support element to form a stowage space configured to receive at least one object;
   a drive means including a motor configured to adjust the wall element; and
   a base element configured to swivel between a storage position and a functional position, and wherein when the wall element moves from the non-use position to the use position, the base element swivels out from the storage position to the functional position to form a base of the stowage space.

2. The stowage compartment assembly of claim 1, wherein the base element is mounted to the support element and configured to swivel with respect to the support element.

3. The stowage compartment assembly of claim 1, wherein the base element is configured to swivel about a swivel axis, wherein the swivel axis is either defined by the front side of the support element or is positioned substantially parallel to the front side of the support element.

4. The stowage compartment assembly of claim 1, wherein when the base element is in the storage position and when the wall element is in the non-use position, the base element is disposed in a gap formed between the wall element and the support element, or when the base element is in the storage position, the base element is disposed in a storage region disposed behind the front side of the support element.

5. The stowage compartment assembly of claim 1, wherein when the base element is in the functional position, the base element lies against the wall element, or when the base element is in the functional position, the base element is spaced apart from the wall element.

6. The stowage compartment assembly of claim 1, wherein the base element is biased from the storage position towards the functional position.

7. The stowage compartment assembly of claim 1, wherein the base element is configured to be adjusted from the storage position to the functional position by means of a gate.

8. The stowage compartment assembly of claim 1, wherein the first section configured to be adjusted by the drive means, and the wall element includes a second section configured to be adjusted relative to the first section by the drive means to adjust the wall element between the non-use position and the use position.

9. The stowage compartment assembly of claim 8, wherein the first section is configured to translate along the support element by the drive means, and the second section is fixed to the support element.

10. The stowage compartment assembly of claim 1, wherein the wall element includes a plurality of segments, each connected to each other in pairs by an elastically flexible bending region, and/or the first section or another section of the wall element is formed by an elastic material.

11. The stowage compartment assembly of claim 10, wherein the first section is formed by a first segment of the plurality of segments, and another section is formed by a second segment of the plurality of segments.

12. The stowage compartment assembly of claim 1, wherein the wall element includes at least one elastically deformable strip element configured to be curved outward away from the contour of the front side to adjust the wall element from the non-use position to the use position.

13. The stowage compartment assembly of claim 12, wherein the at least one elastically deformable strip element is connected to at least one section of the wall element and to at least one stiffening element configured to locally counteract deformation of the strip element.

14. A stowage compartment assembly for use in a vehicle, the stowage compartment assembly comprising:
   a support element including a front side forming a contour;
   a wall element arranged on the front side of the support element and adjustable between a non-use position and a use position, wherein when the wall element is in the non-use position, the wall element extends along the contour, and when the wall element is in the use position, a first section of the wall element projects from the front side of the support element and at least a portion of the first section is elastically deformed, and the wall element forms a stowage space configured to receive at least one object;
   a drive means including a motor configured to adjust the wall element; and
   at least one sensor means configured to detect an object disposed in a region surrounding the wall element and generate a signal wherein adjustment of the wall element by means of the drive means is based on the signal.

15. The stowage compartment assembly of claim 14, wherein the sensor means is configured to detect the at least one object disposed in the stowage space.

16. The stowage compartment assembly of claim 15, further comprising:
a controller is configured to, responsive to the sensor means detecting the object disposed in the stowage space and the wall element moving from the use position to the non-use position, command the drive means to move the wall element so that the wall element clamps the object.

17. The stowage compartment assembly of claim 15, further comprising:
a controller is configured to, responsive to the sensor means detecting the object disposed in the stowage space and the wall element adjusting from the use position to the non-use position, command the drive means to stop the wall element from adjusting.

18. The stowage compartment assembly of claim 14, wherein the sensor means is configured to detect an object disposed in front of the wall element.

19. The stowage compartment assembly of claim 18, wherein the sensor means is configured to detect, in a contactless manner, an operating event and wherein the controller is further configured to trigger the drive means to adjust the wall element between the use position and the non-use position.

20. A method of adjusting a wall element of a stowage compartment assembly including the wall element, arranged on a front side of a support element and adjustable between a non-use position and a use position, wherein when the wall element, is in the non-use position, the wall element extends along a contour formed by the front side of the support element, and when the wall element is in the use position, a section of the wall element elastically deforms and projects from the front side of the support element and the wall element forms a stowage space configured to receive at least one object, the method comprising:
adjusting the wall element based on receiving a signal from a sensor means indicative of an object detected by the sensor means and disposed in a region surrounding the wall element.

\* \* \* \* \*